(12) United States Patent
Holm (10) Patent No.: US 7,721,530 B2
(45) Date of Patent: May 25, 2010

(54) CRANKCASE VENTILATION SYSTEM

(75) Inventor: Thomas Holm, Knivsta (SE)

(73) Assignee: Haldex Hydraulics AB (SE)

( * ) Notice: Subject to any disclaimer, the term of this patent is extended or adjusted under 35 U.S.C. 154(b) by 855 days.

(21) Appl. No.: 11/249,286

(22) Filed: Oct. 13, 2005

(65) Prior Publication Data

US 2007/0084194 A1  Apr. 19, 2007

(51) Int. Cl.
*F01N 3/00* (2006.01)

(52) U.S. Cl. .............. 60/283; 60/274; 60/297; 60/311; 60/324

(58) Field of Classification Search .......... 60/283, 60/285, 297, 311, 274, 295, 324
See application file for complete search history.

(56) References Cited

U.S. PATENT DOCUMENTS

| | | | | |
|---|---|---|---|---|
| 3,050,376 A | * | 8/1962 | Bishop et al. | 422/168 |
| 3,086,353 A | * | 4/1963 | Ridgway | 60/285 |
| 3,209,531 A | * | 10/1965 | Morris et al. | 60/274 |
| 3,224,188 A | * | 12/1965 | Barlow | 60/278 |
| 3,285,709 A | * | 11/1966 | Eannarino et al. | 422/114 |
| 3,846,980 A | * | 11/1974 | DePalma | 60/279 |
| 3,875,916 A | * | 4/1975 | Patton | 123/573 |
| 3,966,443 A | * | 6/1976 | Okano et al. | 55/337 |
| 4,197,703 A | * | 4/1980 | Holmes | 60/319 |
| 4,827,715 A | * | 5/1989 | Grant et al. | 60/283 |
| 5,085,049 A | * | 2/1992 | Rim et al. | 60/274 |
| 5,611,204 A | | 3/1997 | Radovanovic et al. | 60/605.2 |
| 6,261,333 B1 | | 7/2001 | Dickson | 55/385.3 |
| 6,575,022 B1 | | 6/2003 | Schneider et al. | 73/118.2 |
| 6,588,201 B2 | * | 7/2003 | Gillespie | 60/283 |
| 6,622,480 B2 | * | 9/2003 | Tashiro et al. | 60/295 |
| 6,729,128 B2 | * | 5/2004 | Shiratani et al. | 60/297 |
| 6,886,545 B1 | | 5/2005 | Holm | 123/568.21 |
| 7,007,459 B2 | * | 3/2006 | Lee | 60/281 |

* cited by examiner

*Primary Examiner*—Thomas E Denion
*Assistant Examiner*—Diem Tran
(74) *Attorney, Agent, or Firm*—St. Onge Steward Johnston & Reens LLC (57) ABSTRACT

A system for venting crankcase emissions from an engine is disclosed generally comprising a crankcase emissions conduit that communicates blow-by gases from the crankcase into the exhaust flow of an exhaust conduit, which includes a venturi, via an inlet located upstream of the minimum inner diameter of the venturi in order to pump the crankcase emissions therethrough. In certain embodiments, the gases are then directed to a filter assembly, which may include a particulate filter and may include a catalyst for facilitating redox of harmful substances to create harmless compounds prior to venting them or recirculating them in the system. In certain advantageous embodiments, an auxiliary oxygen supply is provided to facilitate these burning processes.

42 Claims, 4 Drawing Sheets

CRANKCASE VENTILATION SYSTEM

FIELD OF THE INVENTION

The present invention relates to a system for venting crankcase emissions from an engine. More specifically, the invention relates to a system for routing the crankcase emissions to the exhaust system of a vehicle for subsequent filtering.

BACKGROUND OF THE INVENTION

As is well know, all piston engines produce some crankcase gases that must be emitted from the crankcase. These crankcase emissions, sometimes referred to as "blow-by" gases, are the result of exhaust gases that leak down into the crankcase from the combustion chamber of the engine's piston cylinders via gaps between the cylinder walls and the piston rings due to the high pressures in the cylinders during compression and combustion. Moreover, the volume of these gases increases over time, as the cylinder liners and piston rings wear, thereby producing more exhaust gas leakage from the combustion chambers.

Because of this leakage, the pressure in the crankcase will rise. However, this pressure should ideally be maintained at a level equal to, or slightly less than, atmospheric pressure in order to avoid causing external oil leakage through various gasketed joints. Therefore, in order to prevent the crankcase gases from pressurizing the crankcase, they must be continually vented therefrom.

Though these gases could be vented to the atmosphere, environmental awareness of crankcase emissions has increased significantly in recent years. As engine emissions have been reduced, the crankcase emissions, which contribute to air pollution, have increasingly become a more significant portion of total engine emissions. Recent regulations have eliminated exceptions for crankcase emissions, treating them the same as other exhaust emissions. Therefore, while it is possible to filter and vent the crankcase emissions to the atmosphere, this method can only be employed when the emission requirements can be satisfied for both the exhaust and crankcase emissions combined.

An alternative to venting these gases to the atmosphere is routing them to the air intake, such as, for example, the systems disclosed in U.S. Pat. No. 6,261,333 to Dickson and U.S. Pat. No. 6,575,022 to Schneider et al. However, as these gases pass through the crankcase, they become contaminated with oil mist. If a crankcase vent is connected directly to the air induction system, the dirty, oily mist may have various ill effects on the engine. This is particularly true in turbocharged engines, where the undesirable consequences of unfiltered crankcase emissions introduced into the engine's air intake can include a decrease in the efficiency of the turbocharger due to coke deposits on the turbine, or a reduction in the performance of the intercooler due to the accumulation of oil, and a significant shortening of the life of the engine. Therefore, it is necessary to filter the crankcase gases prior to introducing them into the air induction system of the engine in order to remove oil and soot, thereby requiring the use of additional filtering assemblies, such as an oil mist separator.

Another alternative, therefore, is to route the crankcase emissions to the exhaust system, which typically already includes a mechanism for disposing of undesirable substances in engine emissions. For example, in a diesel powered vehicle, a diesel particulate filter (DPF) may be positioned in the flow path of the exhaust in order to reduce the amount of soot and harmful gases ultimately emitted. A DPF generally comprises a ceramic filter that traps the particulates in the exhaust gas as it flows through the filter. At high exhaust temperatures, these trapped particulates are burned, resulting in harmless carbon dioxide emissions. Typically, the DPF will employ catalysts—via either a separate catalyst section preceding the filter section or a catalyzed wall filter section—to facilitate oxidation, thereby converting harmful compounds—like hydrocarbons and carbon monoxide—into harmless compounds. Similarly, the use of a catalyst can facilitate oxidation of the carbons trapped in the particulate filter to burn these particulates at lower temperatures. However, the use of such a system may require additional energy consumption to pump the crankcase emissions into the exhaust flow.

What is desired, therefore, is a system for venting blow-by gases from the crankcase of an engine. What is further desired is system of crankcase ventilation that does not require additional filtering assemblies to burn harmful compounds in these emissions. What is also desired is a system that does not require excessive energy consumption to vent and filter the gases.

SUMMARY OF THE INVENTION

Accordingly, it is an object of the present invention to provide a system for the ventilation of blow-by gases from the crankcase of an engine that results in the emission of harmless compounds.

It is a further object of the present invention to provide a system for venting a crankcase that permits the usage of filtering mechanisms that are already present in the vehicle.

It is yet another object of the present invention to provide a system for venting a crankcase that is powered by energy already available in the system.

In order to overcome the deficiencies of the prior art and to achieve at least some of the objects and advantages listed, the invention comprises a crankcase ventilation system, including an exhaust gas conduit through which exhaust gas flows from an engine, and a crankcase emissions conduit through which crankcase emissions flow from the engine, wherein the exhaust gas conduit includes a crankcase emissions inlet through which the crankcase emissions flow from the crankcase emissions conduit into the exhaust gas conduit, and wherein the exhaust gas conduit includes a reduced portion having a minimum inner diameter, the minimum inner diameter being located downstream of the crankcase emissions inlet, for drawing the crankcase emissions therethrough.

In another embodiment, the invention comprises a crankcase ventilation system, including an exhaust gas conduit through which exhaust gas flows from an engine, the conduit having an upstream portion and a downstream portion, the upstream portion having an inlet, and a crankcase emissions conduit through which crankcase emissions flow from the engine to the inlet and into the upstream portion of the exhaust gas conduit, wherein the exhaust gas conduit includes a venturi portion located downstream of the upstream portion by which the pressure of the exhaust gas flowing therethrough is decreased in order to pump the crankcase emissions into the exhaust gas conduit and towards the downstream portion.

In yet another embodiment, the invention comprises a crankcase ventilation system, including an engine having a cylinder and a crankcase, the engine having an exhaust port through which exhaust gas is discharged from the cylinder, and a crankcase vent through which blow-by gas in the crankcase is vented therefrom, an exhaust gas conduit in fluid communication with the exhaust port for communicating the exhaust gas therefrom, the conduit having a blow-by gas inlet and a reduced portion having a minimum inner diameter located downstream of the blow-by gas inlet, a blow-by gas conduit in fluid communication with the crankcase vent and the blow-by gas inlet, through which conduit the blow-by gas is communicated from the crankcase into the exhaust gas conduit upstream of the minimum inner diameter of the reduced portion of the exhaust gas conduit, and a filter assembly in fluid communication with the reduced portion of the exhaust gas conduit for receiving the exhaust and blow-by gases therefrom and burning particulates in the gases.

In still another embodiment, the invention comprises a method for ventilating a crankcase, including providing an exhaust conduit with a reduced portion having a minimum inner diameter, providing a filter assembly in fluid communication with, and downstream of, the reduced portion of the exhaust conduit, communicating exhaust gas from an engine through the exhaust conduit to the filter assembly, and communicating crankcase emissions from the engine into the exhaust conduit upstream of the minimum inner diameter of the reduced portion of the exhaust conduit such that the flow of exhaust gas pumps the crankcase emissions through the exhaust conduit to the filter assembly.

DETAILED DESCRIPTION OF THE DRAWINGS

Figure 1:
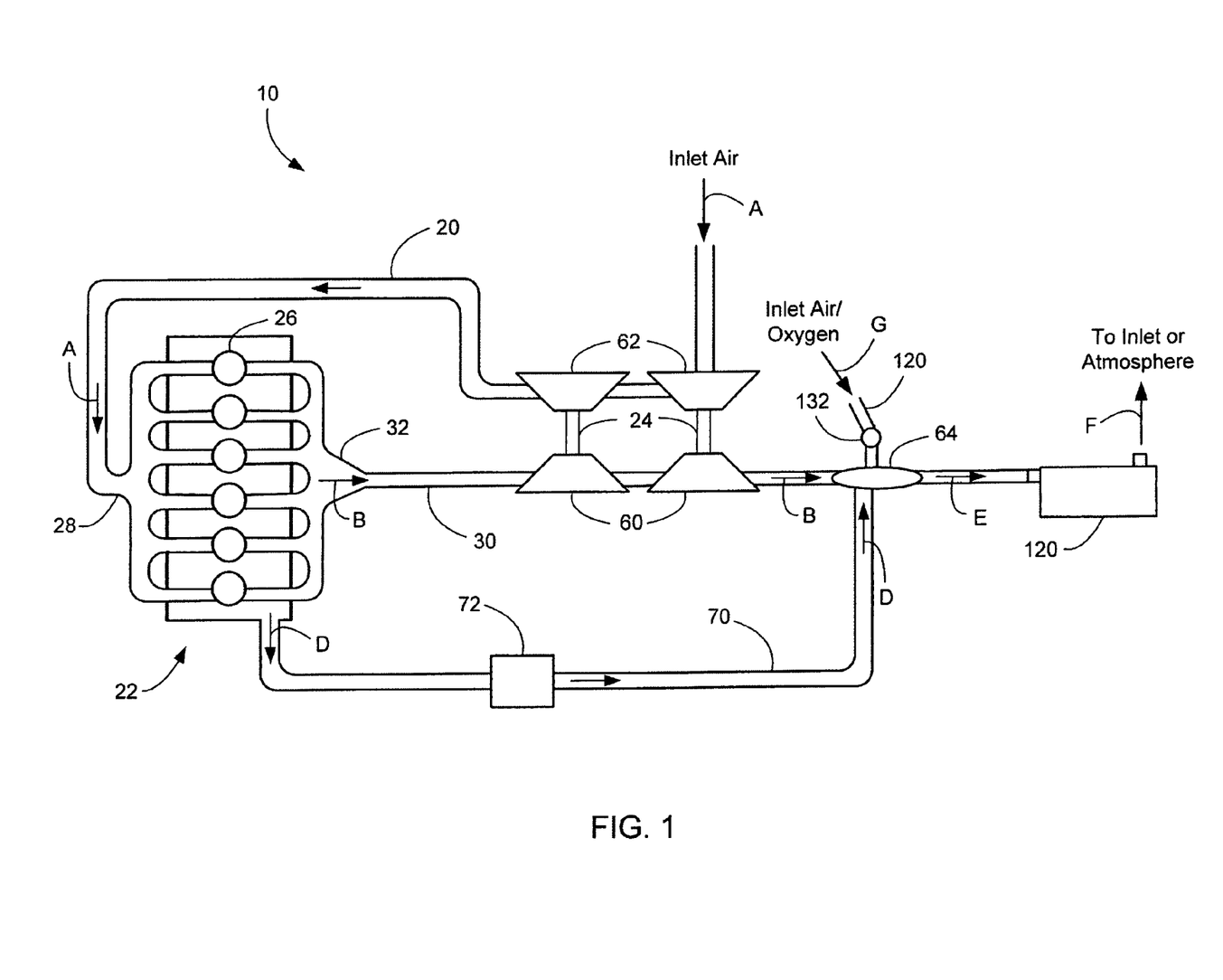
FIG. 1 is a schematic view of a crankcase ventilation system in accordance with the invention.

The basic components of one embodiment of a crankcase ventilation system 10 in accordance with the invention are illustrated in FIG. 1. As used in the description, the terms "top," "bottom," "above," "below," "over," "under," "above," "beneath," "on top," "underneath," "up," "down," "upper," "lower," "front," "rear," "back," "forward" and "backward" refer to the objects referenced when in the orientation illustrated in the drawings, which orientation is not necessary for achieving the objects of the invention.

The system 10 includes an air inlet conduit 20 that supplies inlet air to an engine 22. As the inlet air flows through the conduit 20, it flows through turbochargers 24, which compress the air, and is subsequently introduced into the cylinders 26 of the engine 22 via an intake manifold 28 (indicated by arrows A). After combustion, the exhaust gases are discharged from the cylinders 26 and are directed to an exhaust gas conduit 30 via an exhaust manifold 32 (indicated by arrows B).

Figure 2:
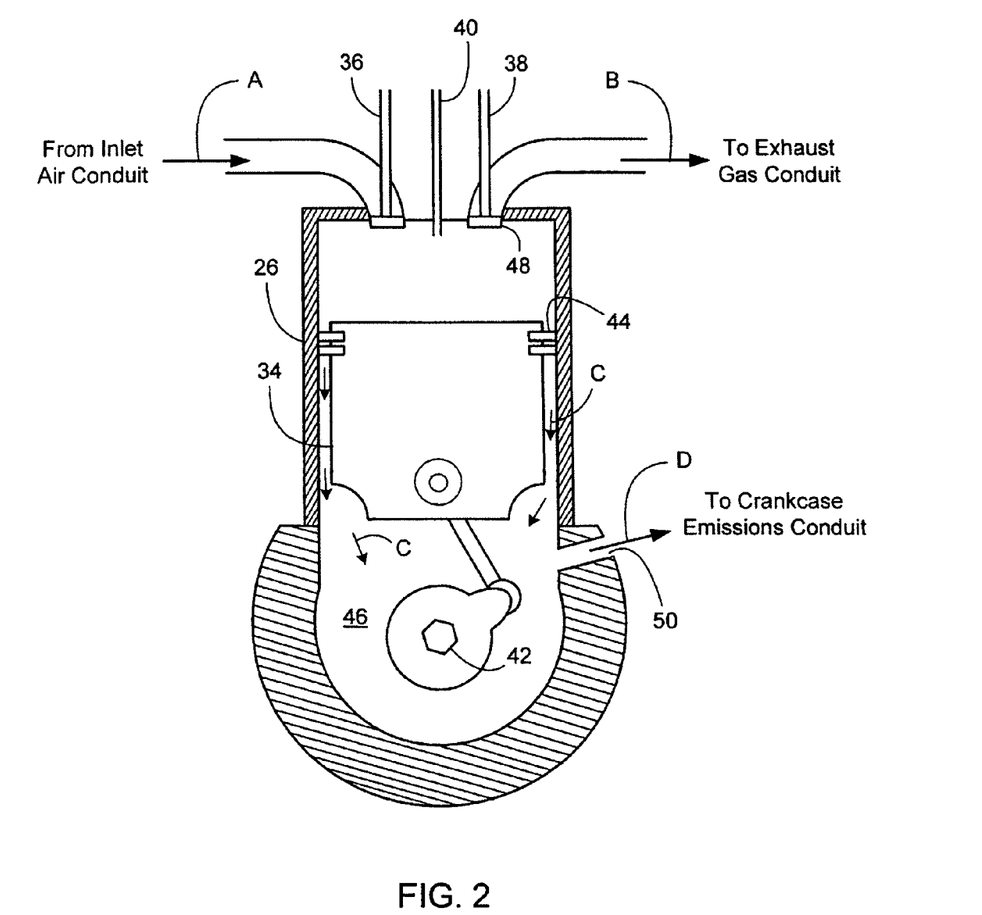
FIG. 2 is a side view in partial cross-section showing additional detail of the engine of the crankcase ventilation system of FIG. 1.

Referring to FIG. 2, each of the cylinders 26 includes a piston 34 to which the crankshaft 42 is connected. By controlling the intake and exhaust valves 36, 38 and the fuel injector 40, the engine 22 generates compression and combustion strokes via the compression and expansion of gases in the cylinder 26 to cause the piston 34 to drive the crankshaft 42. During this process, some of the gases leak down past the piston rings 44 and into the crankcase 46 (indicated by arrows C). As a result, during the exhaust stroke, when the exhaust valve 38 is opened and the piston moves in an upward direction to expel the exhaust gases from the cylinder 26, not all of the gases are discharged via the exhaust port 48. Accordingly, in order to prevent excessive build-up of these gases in the crankcase 46, and the undesired pressurization caused thereby, a crankcase vent 50 is provided, through which the crankcase ("blow-by") gases are vented therefrom (indicated by arrows D).

Referring again to FIG. 1, after the exhaust gases are discharged from the cylinder 26, the exhaust gases flow through the exhaust conduit 30 (arrows B). The exhaust gas flows through the turbochargers 24, spinning turbines 60, which, in turn, spin air pumps 62, thereby compressing the inlet air flowing through inlet air conduit 20 to increase power in the engine 22. The exhaust gas continues through the exhaust gas conduit 30 to a venturi 64.

After the blow-by gases are vented from the crankcase 46, these crankcase emissions flow through a crankcase emissions conduit 70. toward the venturi 64. In certain embodiments, a filter 72 is positioned in the flow path of these crankcase emissions to provide some filtering of these gases prior to introduction into the venturi 64.

Figure 3:
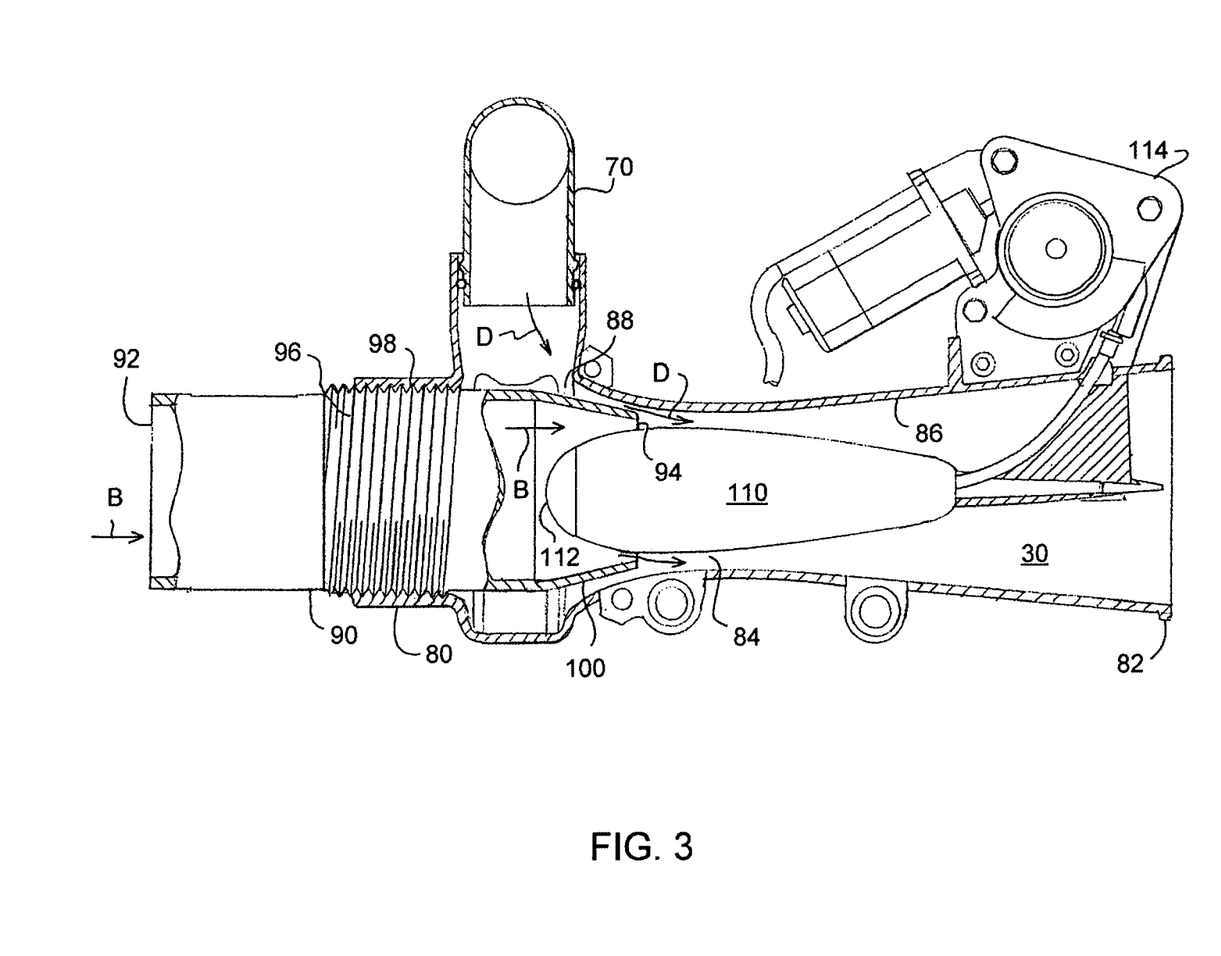
FIG. 3 is a side view in partial cross-section showing additional detail of the exhaust gas conduit of the crankcase ventilation system of FIG. 1.

As shown in FIG. 3, the exhaust conduit includes an upstream portion 80 and a downstream portion 82, and a venturi portion 84 downstream of the upstream portion 80. This venturi portion 84 includes a reduced portion of the inner wall 86. A crankcase emissions inlet 88 passes through the wall of the exhaust gas conduit 30, through which the crankcase emissions are introduced from the crankcase emissions conduit 70 into the exhaust conduit 30 (arrows D). The reduced portion of the inner wall 86 has a minimum inner diameter located downstream of the inlet 88. Accordingly, the velocity of the exhaust gas is increased in this region, while the pressure decreases, thereby creating a low pressure area directly adjacent the minimum inner diameter of the wall 86 that serves as a sort of vacuum, which effectively pumps the crankcase emissions into and through the venturi 84.

In certain advantageous embodiments, a sleeve 90, through which the exhaust gas flows, has an inlet end 92 and an outlet end 94, and at least the outlet end 94 is positioned within the conduit wall 86. Accordingly, exhaust gas enters the sleeve 90 via inlet end 92, flows through the sleeve 90, and exits the sleeve 90 via outlet end 94 (arrows B). The sleeve 90 can be positioned such that the outlet end 94 at least partially occludes the inlet 88, thereby decreasing the flow of crankcase emissions into the exhaust gas conduit 30. At least a portion of the sleeve 90 can be displaced longitudinally along the exhaust conduit 30 to alter the extent to which the outlet end 94 occludes the inlet 88, allowing the introduction of blow-by gases into the exhaust gas conduit 30 to be regulated.

In certain advantageous embodiments, a portion of the sleeve 90 has a threaded outer surface 96, and a portion of the conduit wall 86 has a corresponding, threaded inner surface 98 for engaging the threaded sleeve surface 96. As a result, the outlet end 94 can be displaced along the exhaust conduit 30 by simply rotating the sleeve 90. In this way, the flow of crankcase emissions into the conduit 30 can be accurately and precisely controlled. In certain advantageous embodiments, the sleeve 90 and the conduit 30 are coaxial.

Various drive mechanisms may be employed to drive the sleeve 90 back and forth through the exhaust gas conduit 30, such as, in the case of a threaded sleeve, a drive mechanism designed to cause rotational movement of the sleeve 90, such as, for example, a gear (not shown) for engaging a corresponding surface on the sleeve 90, or, in the case of an unthreaded sleeve 90, a drive mechanism designed to cause linear movement of the sleeve 90, such as, for example, a pinion (not shown) for engaging teeth on the underside of the sleeve 90.

In certain advantageous embodiments, the cross-sectional area of the outlet end 94 is smaller than the cross-sectional area of the inlet end 92, such that some throttling of the inlet air flowing through the sleeve 90 occurs in this reduced portion. In certain embodiments, this reduced portion is simply a necked portion of the sleeve 90, and in some embodiments, it comprises a tapered section 100, which, for example, may have a frustoconical shape. Likewise, the cross-sectional area of a portion of the conduit 30 in which the outer end 94 of the sleeve 90 moves is also reduced, providing a similar throttling effect. In some embodiments, this reduced section is necked or tapered, resulting in the venturi 84.

When the sleeve 90 is rotated longitudinally in the direction of the venturi 84, the annular, tapered section 100 of the sleeve 90 approaches the annular, tapered wall of the venturi 84. In this way, the sleeve 90, in conjunction with the venturi 84, acts as a flow regulator for the crankcase emissions entering the conduit 30 and mixing with the exhaust gas. The tapered section 100 of the sleeve 90 is designed with a cross-sectional area that decreases towards the tip of the outlet end 94. Similarly, the venturi 84 has a cross-sectional area that decreases in the direction of flow of the conduit 30. Furthermore, this reduction in the cross-sectional area of the venturi 84 is greater than the reduction in the cross-sectional area of the outlet end 94. Because of this arrangement, as the sleeve 90 is rotated in the direction of the flow through the conduit 30, the inlet 88 becomes smaller, restricting the amount of blow-by gases that are communicated into the exhaust gas conduit 30.

Moreover, as the size of the inlet 88 changes in accordance with the movement of the outlet end 94 of the sleeve 90, the point of entry of the crankcase emission into the flow of exhaust gas likewise changes. Accordingly, the greatest throttling of the exhaust gas flowing through the exhaust conduit 30 (i.e., passing through the outlet end 94 of the sleeve 90) is always achieved at the point at which the crankcase emissions enter the conduit 30, independently of the position of the sleeve 90.

In some embodiments, a streamlined body 110 is disposed in the conduit 30 that may be positioned to at least partly occlude the outlet end 94 of the sleeve 90. Accordingly, in addition to the reduction resulting from the tapered section 100, further throttling of the exhaust gas flowing through the conduit 30 can be achieved by limiting the amount of gas exiting the sleeve 90 by employing the streamlined body 110. In certain advantageous embodiments, the streamlined body 110 has a tapered end 112, which may, for example, be ovoid in shape. Due to this shape of the tapered end 112, the space between the perimeter of the outlet end 94 and the body 110 may be decreased and increased by moving the sleeve 90 forward and backward along the conduit 30.

In some of these embodiments, the streamlined body 110 is fixed to the conduit 30 such that it remains stationary with respect to the conduit 30. Accordingly, the flow of exhaust gas through the conduit 30 can be controlled by moving the sleeve 90 back and forth over the end of the body 110 to partly occlude, and vary the extent of occlusion of, the outlet end 94 of the sleeve 90. In this way, the flow of exhaust gas through the conduit 30 can be rapidly increased with minimal movement of the sleeve 90 due to the sharp curve of the body 110.

In other embodiments, an actuator 114 is provided for displacing the streamlined body 110 backwards and forwards along the conduit 30, causing the tapered end 112 to move back and forth through the outlet end 94. In this way, the flow of exhaust gas through the conduit 30 can be altered independently of the alteration of the blow-by gas flow. The actuator 114 may be located outside of the conduit 30 and connected to the body 110, or may located within the streamlined body 110 itself, as is described in published U.S. Patent Application Ser. No. US 2004/0099257 to Berggren et al., the specification of which is hereby incorporated herein by reference.

With this arrangement, in addition to generally providing desirable mixing and pumping effects, the sleeve 90 can be used to control the speed of the blow-by gas, while the body 110 can be used to control the speed of the exhaust gas, and the relative speed between the two can be controlled by coordinating the movement of the two. Furthermore, in certain embodiments, the sleeve 90 may be advanced far enough along the conduit 30 such that the flow of blow-by gas into the conduit 30 is completely shut off. The outlet end 94 can be advanced through the necking of the venturi 84 until it comes flush up against the wall of the conduit 30, just downstream of the maximum diameter of the body 110.

In some embodiments, the streamlined body 110 is disposed in the conduit 30 such that the maximum diameter of the body 110 is located downstream of the sleeve 90, and the body 110 is positioned substantially outside of the sleeve 90, as shown in FIG. 3. Accordingly, in these embodiments, the flow path is convergent until the point where the crankcase emissions are introduced into the flow of the exhaust gas, and thus, does not become divergent until the two gases have mixed. However, in other embodiments, the streamlined body 110 may be located within the sleeve 90.

In other embodiments, no sleeve 90 may be used, and the streamlined body 110 itself may be employed to vary the cross-sectional area of the conduit 30 through which both the exhaust gas and crankcase emissions may flow to the downstream portion 82 of the conduit, as is described for regulating the flows of both inlet air and recirculation exhaust gas in published U.S. Patent Application Ser. No. US 2004/0099257.

Refering again to FIG. 1, after flowing through the venturi portion 84, the exhaust and blow-by gases flow through the downstream portion 82 to a filter assembly 120 (indicated by arrows E), where they are filtered prior to venting them to atmosphere or returning them to the inlet conduit 20 for recirculation through the system. The filter assembly 120 may, for example, comprise a diesel particulate filter, such as an upstream diesel particulate filter or a wall-flow diesel particulate filter, which includes an oxidation and/or reduction catalyst and a particulate filter.

Figure 4:
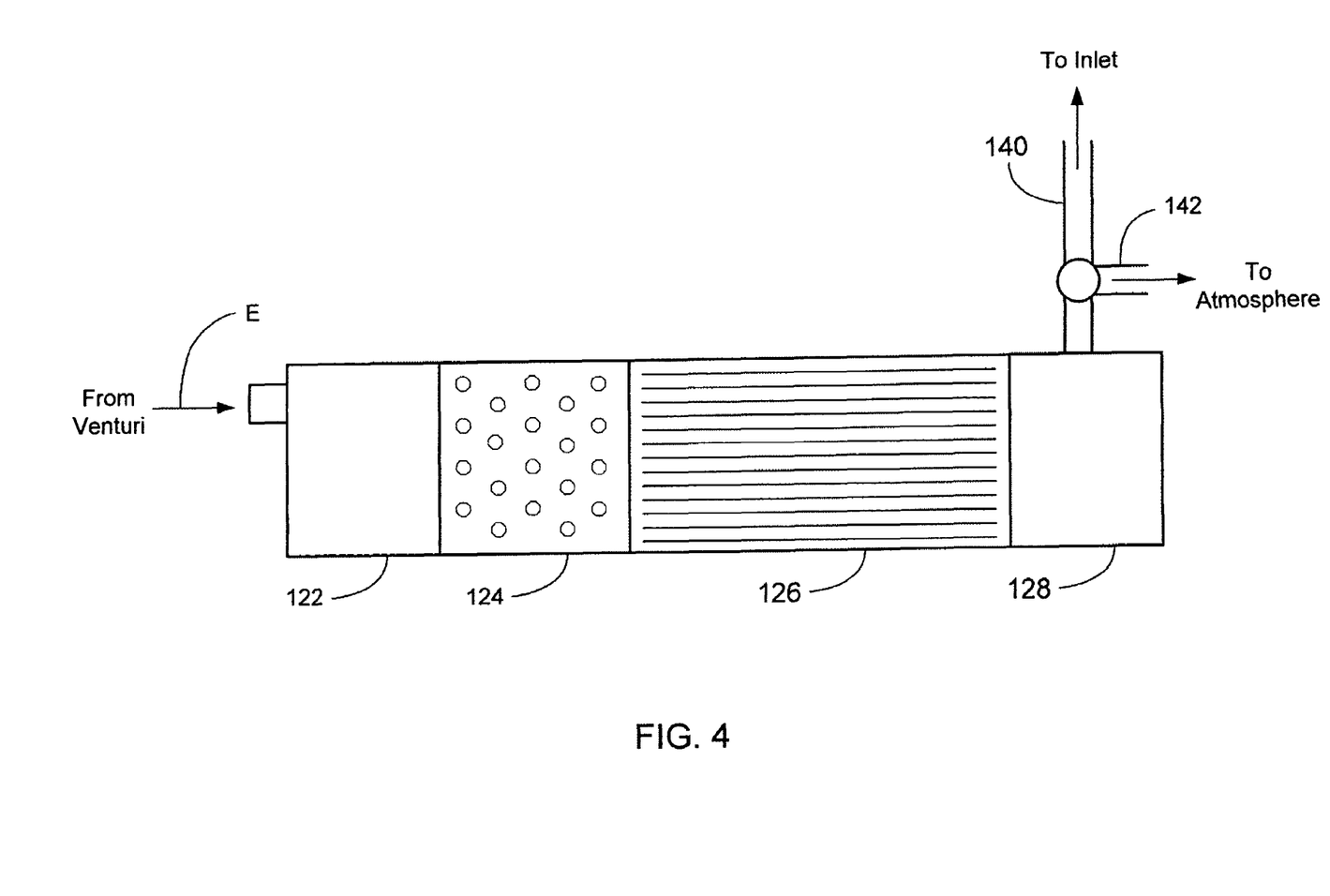
FIG. 4 is side view showing additional detail of the filter assembly of the crankcase ventilation system of FIG. 1.

For example, referring to FIG. 4, in certain advantageous embodiments, the filter includes an inlet section 122, a catalyst section 124, a filter section 126, and an outlet section 128. The filter section 126 comprises a particulate filter, which traps undesired particulates that are present in the gases. The catalyst section 124 may include, for example, a ceramic honeycomb coated with a redox catalyst, such as platinum, palladium, or rhodium, to convert harmful compounds—namely, hydrocarbons, carbon monoxide, and nitrous oxides—into harmless compounds—namely, carbon dioxide and water, carbon dioxide, and nitrogen, respectively. The high temperature gases flow into the filter section 126, and the particulates trapped therein are burned off. As explained above, a catalyst is typically employed to facilitate oxidation of the carbon particles to cause burning at lower exhaust temperatures. In certain embodiments, an auxiliary oxygen supply 130, such as a conduit for regular inlet air or a reserve of oxygen that is controllable by a valve 132, provides additional oxygen to the conduit 30 in order to facilitate the burning process (indicated by arrow G). Though separate catalyst and filter sections 124, 126 have been described herein, in some embodiments, instead of employing a honeycomb or bead catalyst section upstream of the filter section 126, the catalyst is integrated into the wall of the filter.

As noted above, after the gases have been filtered in this way, they may be returned to the inlet conduit via a recirculation conduit 140 to be recirculated through the system, or may be safely vented to the atmosphere via a vent 142 (indicated by arrow F).

It should be understood that the foregoing is illustrative and not limiting, and that obvious modifications may be made by those skilled in the art without departing from the spirit of the invention. Accordingly, reference should be made primarily to the accompanying claims, rather than the foregoing specification, to determine the scope of the invention.

What is claimed is:

1. A crankcase ventilation system, comprising:
   an exhaust gas conduit through which exhaust gas flows from an engine; and
   a crankcase emissions conduit through which crankcase emissions flow from the engine;
   wherein said exhaust gas conduit includes a crankcase emissions inlet through which the crankcase emissions flow from said crankcase emissions conduit into said exhaust gas conduit; and
   wherein said exhaust gas conduit includes a reduced portion having a minimum inner diameter, the minimum inner diameter being located downstream of said crankcase emissions inlet, for drawing the crankcase emissions therethrough; and
   a streamlined body disposed in said exhaust gas conduit and having an end positionable in the reduced portion of said exhaust gas conduit and moveable along at least part of the reduced portion of said exhaust gas conduit to vary the amount of flow therethrough.

2. The system of claim 1, wherein said crankcase emissions conduit includes a filter.

3. The system of claim 1, wherein the reduced portion of said exhaust gas conduit comprises a tapered venturi.

4. The system of claim 1, wherein said exhaust gas conduit is defined by a wall, and the crankcase emissions inlet passes through the wall of said exhaust gas conduit.

5. The system of claim 1, further comprising a filter assembly located downstream of the reduced portion of said exhaust gas conduit.

6. The system of claim 5, wherein said filter assembly includes a particulate filter.

7. The system of claim 6, wherein said filter assembly includes an oxidation catalyst.

8. The system of claim 7, wherein said filter assembly comprises an upstream catalyst diesel particulate filter.

9. The system of claim 8, wherein said filter assembly comprises a wall-flow catalyst diesel particulate filter.

10. The system of claim 5, further comprising an auxiliary oxygen conduit through which oxygen flows, wherein said exhaust gas conduit has an auxiliary oxygen inlet through which the oxygen flows from said auxiliary oxygen conduit into said exhaust gas conduit.

11. The system of claim 10, further comprising a control valve for regulating the flow of oxygen through said auxiliary oxygen inlet.

12. The system of claim 5, further comprising
    an air inlet conduit through which inlet air is supplied to the engine; and
    a recirculation conduit through which gases flow from said filter assembly to said air inlet conduit.

13. The system of claim 5, further comprising a vent through which gas flowing from said filter assembly is vented to the atmosphere.

14. A crankcase ventilation system, comprising:
    an exhaust gas conduit through which exhaust gas flows from an engine, said conduit having an upstream portion and a downstream portion, said upstream portion having an inlet; and
    a crankcase emissions conduit through which crankcase emissions flow from the engine to said inlet and into said upstream portion of said exhaust gas conduit;
    wherein said exhaust gas conduit includes a venturi portion located downstream of said upstream portion by which the pressure of the exhaust gas flowing therethrough is decreased in order to pump the crankcase emissions into said exhaust gas conduit and towards said downstream portion; and
    a streamlined body disposed in said exhaust gas conduit and having an end positionable in the venturi portion of said exhaust gas conduit and moveable along at least part of the venturi portion of said exhaust gas conduit to vary the amount of flow therethrough.

15. The system of claim 14, further comprising a filter assembly in fluid communication with said venturi portion and downstream thereof for burning the crankcase emissions pumped through said venturi portion.

16. The system of claim 15, wherein said filter assembly comprises an oxidation catalyst and a particulate filter for trapping and burning particulates.

17. A crankcase ventilation system, comprising:
    an engine having a cylinder and a crankcase, said engine having an exhaust port through which exhaust gas is discharged from said cylinder, and a crankcase vent through which blow-by gas in said crankcase is vented therefrom;
    an exhaust gas conduit in fluid communication with said exhaust port for communicating the exhaust gas therefrom, said conduit having a blow-by gas inlet and a reduced portion having a minimum inner diameter located downstream of the blow-by gas inlet;
    a blow-by gas conduit in fluid communication with said crankcase vent and said blow-by gas inlet, through which conduit the blow-by gas is communicated from said crankcase into said exhaust gas conduit upstream of the minimum inner diameter of the reduced portion of said exhaust gas conduit;
    a filter assembly in fluid communication with the reduced portion of said exhaust gas conduit for receiving the exhaust and blow-by gases therefrom and burning particulates in the gases; and
    a streamlined body disposed in said exhaust gas conduit and having an end positionable in the reduced portion of said exhaust gas conduit and moveable along at least part of the reduced portion of said exhaust gas conduit to vary the amount of flow therethrough.

18. The system of claim 17, wherein said filter assembly comprises an oxidation catalyst and a particulate filter for trapping and burning the particulates.

19. The system of claim 17, wherein said filter assembly comprises an oxidation catalyst and a particulate filter for trapping and burning the particulates.

20. A method for ventilating a crankcase, the method comprising:
    providing an exhaust conduit with a reduced portion having a minimum inner diameter;
    providing a filter assembly in fluid communication with, and downstream of, the reduced portion of the exhaust conduit;
    communicating exhaust gas from an engine through the exhaust conduit to the filter assembly;

communicating crankcase emissions from the engine into the exhaust conduit upstream of the minimum inner diameter of the reduced portion of the exhaust conduit such that the flow of exhaust gas pumps the crankcase emissions through the exhaust conduit to the filter assembly; and regulating the amount of crankcase emissions communicated into the exhaust conduit, wherein the step of regulating comprises the step of controlling the position of a body disposed in the exhaust conduit to vary the extent to which the body occludes an inlet for the crankcase emissions.

21. The method of claim 20, wherein the filter assembly comprises an oxidation catalyst and a particulate filter for trapping and burning particulates.

22. The method of claim 20, further comprising the step of supplying an auxiliary flow of oxygen to the exhaust conduit.

23. The method of claim 20, further comprising the step of filtering the crankcase emissions before communicating the crankcase emissions into the exhaust conduit.

24. A crankcase ventilation system, comprising:
an exhaust gas conduit through which exhaust gas flows from an engine; and
a crankcase emissions conduit through which crankcase emissions flow from the engine;
wherein said exhaust gas conduit includes a crankcase emissions inlet through which the crankcase emissions flow from said crankcase emissions conduit into said exhaust gas conduit;
wherein said exhaust gas conduit includes a reduced portion having a minimum inner diameter, the minimum inner diameter being located downstream of said crankcase emissions inlet, for drawing the crankcase emissions therethrough;
a sleeve disposed in said exhaust gas conduit and through which exhaust gas flows, said sleeve having an outlet end positionable along said exhaust gas conduit to at least partly occlude said crankcase emissions inlet and movable along a portion of said exhaust gas conduit to vary the extent of occlusion of said crankcase emissions inlet in order to regulate the flow of crankcase emissions into said exhaust gas conduit;
a streamlined body disposed in said exhaust gas conduit and positionable along said exhaust gas conduit to at least partly occlude the outlet end of said sleeve; and
an actuator for moving said streamlined body along said exhaust gas conduit to vary the extent of occlusion of the outlet end of said sleeve in order to regulate flow of exhaust gas out of said sleeve.

25. A crankcase ventilation system, comprising:
an exhaust gas conduit through which exhaust gas flows from an engine; and
a crankcase emissions conduit through which crankcase emissions flow from the engine;
wherein said exhaust gas conduit includes a crankcase emissions inlet through which the crankcase emissions flow from said crankcase emissions conduit into said exhaust gas conduit; and
wherein said exhaust gas conduit includes a reduced portion having a minimum inner diameter, the minimum inner diameter being located downstream of said crankcase emissions inlet, for drawing the crankcase emissions therethrough; and
a sleeve disposed in said exhaust gas conduit and through which exhaust gas flows, said sleeve having an outlet end positionable along said exhaust gas conduit to at least partly occlude said crankcase emissions inlet and movable along a portion of said exhaust gas conduit to vary the extent of occlusion of said crankcase emissions inlet in order to regulate the flow of crankcase emissions into said exhaust gas conduit.

26. The system of claim 25, wherein said crankcase emissions conduit includes a filter.

27. The system of claim 25, wherein the reduced portion of said exhaust gas conduit comprises a tapered venturi.

28. The system of claim 25, further comprising a filter assembly located downstream of the reduced portion of said exhaust gas conduit.

29. The system of claim 28, wherein said filter assembly includes a particulate filter.

30. The system of claim 29, wherein said filter assembly includes an oxidation catalyst.

31. The system of claim 30, wherein said filter assembly comprises an upstream catalyst diesel particulate filter.

32. The system of claim 30, wherein said filter assembly comprises a wall-flow catalyst diesel particulate filter.

33. The system of claim 28, further comprising an auxiliary oxygen conduit through which oxygen flows, wherein said exhaust gas conduit has an auxiliary oxygen inlet through which the oxygen flows from said auxiliary oxygen conduit into said exhaust gas conduit.

34. The system of claim 33, further comprising a control valve for regulating the flow of oxygen through said auxiliary oxygen inlet.

35. The system of claim 28, further comprising
an air inlet conduit through which inlet air is supplied to the engine; and
a recirculation conduit through which gases flow from said filter assembly to said air inlet conduit.

36. The system of claim 28, further comprising a vent through which gas flowing from said filter assembly is vented to the atmosphere.

37. The system of claim 25, further comprising a streamlined body disposed in said exhaust gas conduit and positionable along said exhaust gas conduit to at least partly occlude the outlet end of said sleeve.

38. The system of claim 37, further comprising an actuator for moving said streamlined body along said exhaust gas conduit to vary the extent of occlusion of the outlet end of said sleeve in order to regulate flow of exhaust gas out of said sleeve.

39. A crankcase ventilation system, comprising:
an exhaust gas conduit through which exhaust gas flows from an engine, said conduit having an upstream portion and a downstream portion, said upstream portion having an inlet; and
a crankcase emissions conduit through which crankcase emissions flow from the engine to said inlet and into said upstream portion of said exhaust gas conduit;
wherein said exhaust gas conduit includes a venturi portion located downstream of said upstream portion by which the pressure of the exhaust gas flowing therethrough is decreased in order to pump the crankcase emissions into said exhaust gas conduit and towards said downstream portion; and
a sleeve disposed in said exhaust gas conduit and through which exhaust gas flows, said sleeve having an outlet end positionable along said exhaust gas conduit to at least partly occlude said inlet and movable along a portion of said exhaust gas conduit to vary the extent of occlusion of said inlet in order to regulate the flow of crankcase emissions into said exhaust gas conduit.

40. The system of claim 39, further comprising a filter assembly in fluid communication with said venturi portion and downstream thereof for burning the crankcase emissions pumped through said venturi portion.

41. The system of claim 40, wherein said filter assembly comprises an oxidation catalyst and a particulate filter for trapping and burning particulates.

42. A crankcase ventilation system, comprising:
- an engine having a cylinder and a crankcase, said engine having an exhaust port through which exhaust gas is discharged from said cylinder, and a crankcase vent through which blow-by gas in said crankcase is vented therefrom;
- an exhaust gas conduit in fluid communication with said exhaust port for communicating the exhaust gas therefrom, said conduit having a blow-by gas inlet and a reduced portion having a minimum inner diameter located downstream of the blow-by gas inlet;
- a blow-by gas conduit in fluid communication with said crankcase vent and said blow-by gas inlet, through which conduit the blow-by gas is communicated from said crankcase into said exhaust gas conduit upstream of the minimum inner diameter of the reduced portion of said exhaust gas conduit;
- a filter assembly in fluid communication with the reduced portion of said exhaust gas conduit for receiving the exhaust and blow-by gases therefrom and burning particulates in the gases; and
- a sleeve disposed in said exhaust gas conduit and through which exhaust gas flows, said sleeve having an outlet end positionable along said exhaust gas conduit to at least partly occlude said blow-by gas inlet and movable along a portion of said exhaust gas conduit to vary the extent of occlusion of said blow-by gas inlet in order to regulate the flow of blow-by gas into said exhaust gas conduit.

* * * * *